United States Patent
Akiyama

(10) Patent No.: US 10,429,563 B2
(45) Date of Patent: Oct. 1, 2019

(54) LAMP INCLUDING LIGHT SOURCE SOCKET AND LIGHT GUIDE

(71) Applicant: Koito Manufacturing Co., Ltd., Tokyo (JP)

(72) Inventor: Kyouhei Akiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/867,795

(22) Filed: Jan. 11, 2018

(65) Prior Publication Data

US 2018/0210127 A1     Jul. 26, 2018

(30) Foreign Application Priority Data

Jan. 24, 2017  (JP) ................................ 2017-010008

(51) Int. Cl.

| F21V 8/00 | (2006.01) |
| F21V 19/00 | (2006.01) |
| F21S 43/245 | (2018.01) |
| F21S 43/237 | (2018.01) |
| F21S 43/247 | (2018.01) |
| F21S 41/24 | (2018.01) |

(52) U.S. Cl.
CPC ............ G02B 6/0006 (2013.01); F21S 41/24 (2018.01); F21S 43/237 (2018.01); F21S 43/245 (2018.01); F21S 43/247 (2018.01); F21V 19/0035 (2013.01); G02B 6/001 (2013.01)

(58) Field of Classification Search
CPC ....... G02B 6/0006; G02B 6/001; F21S 41/24; F21S 41/285; F21S 43/235; F21S 43/236; F21S 43/237; F21S 43/245; F21S 43/247
See application file for complete search history.

(56) References Cited

U.S. PATENT DOCUMENTS

| 7,789,547 | B2* | 9/2010 | Holder ................. | G02B 6/0008 362/559 |
| 2004/0184286 | A1* | 9/2004 | De Lamberterie .. | B60Q 1/0052 362/559 |
| 2005/0270794 | A1* | 12/2005 | Okamoto ................ | F21V 5/008 362/555 |
| 2008/0225548 | A1* | 9/2008 | Eichelberger .......... | G02B 6/001 362/551 |

(Continued)

FOREIGN PATENT DOCUMENTS

JP        2013-191406 A      9/2013

*Primary Examiner* — Alexander K Garlen
(74) *Attorney, Agent, or Firm* — Abelman, Frayne & Schwab

(57) ABSTRACT

A light source socket is detachably attached to a housing of a vehicular lamp, and the light emitted by an LED on the light source socket is incident on a light-incident portion of a light guide to be guided to a light-emitting portion. The light guide is held by a pair of holding members at a predetermined position of a lamp housing via a reflector. Positioning portions configured to sandwich the light-emitting portion therebetween are formed on the holding members, respectively, and the light-incident portion is held at a fixed position with respect to the LED. The LED is surrounded by light-shielding walls of the holding members, and the light emitted to the periphery of the light-incident portion is returned to the light-incident portion by reflective films of the light-shielding walls.

13 Claims, 6 Drawing Sheets

(56) References Cited

U.S. PATENT DOCUMENTS

| | | | | |
|---|---|---|---|---|
| 2010/0149829 A1* | 6/2010 | Kazaoka | ................ | F21V 7/005 |
| | | | | 362/519 |
| 2011/0228549 A1* | 9/2011 | Lindsay | ............... | G02B 6/0006 |
| | | | | 362/555 |
| 2012/0218775 A1* | 8/2012 | Nakada | ................ | G02B 6/0006 |
| | | | | 362/602 |
| 2013/0322104 A1* | 12/2013 | Baert | ................... | G02B 6/4292 |
| | | | | 362/511 |
| 2014/0334171 A1* | 11/2014 | Kropac | ................. | G02B 6/001 |
| | | | | 362/510 |
| 2016/0245472 A1* | 8/2016 | Ah | ...................... | G02B 6/0006 |

* cited by examiner

LAMP INCLUDING LIGHT SOURCE SOCKET AND LIGHT GUIDE

CROSS-REFERENCE TO RELATED APPLICATIONS

This application is based on and claims priority from Japanese Patent Application No. 2017-010008, filed on Jan. 24, 2017, with the Japan Patent Office, the disclosure of which is incorporated herein in their entireties by reference.

TECHNICAL FIELD

The present disclosure relates to a lamp having a structure for positioning a light-incident portion of a light guide with respect to a semiconductor light-emitting element on a light source socket.

BACKGROUND

In the related art, in a lamp that allows the light emitted from a semiconductor light-emitting element to be incident on a light guide, the semiconductor light-emitting element is unitized into a light guide and assembled as a single optical component in a lamp housing such that the relative positions of the semiconductor light-emitting element and the light guide do not change. For example, in the vehicular lamp of Japanese Laid-Open Patent Publication No. 2013-191406, an LED is fixed at a position facing an light-incident portion (end face) of a light guide by a support member and both ends of the light guide are supported on a lamp housing by a separate support member so that the light guide is able to generate uniform light over the entire length.

SUMMARY

In a lamp in which a semiconductor light-emitting element is provided on a light source socket, which is detachably attached to a lamp housing, since a light guide is assembled to the lamp housing using an assembly member which is separate from the light source socket, it was difficult to maintain the relative positions of the light source socket and the light guide constantly. Therefore, for example, in the case of a vehicular lamp, the relative positions of the semiconductor light-emitting element on the light source socket and the light-incident portion of the light guide were changed by the vibration of the vehicle body and a part of light emitted by the semiconductor light-emitting element leaked from the periphery of the light-incident portion to an unexpected region.

Therefore, the present disclosure enhances the reliability of a socket lamp by holing the light-incident portion of the light guide at a predetermined position with respect to the semiconductor light-emitting element on the light source socket.

In order to solve the above-described problem, the lamp of the present disclosure includes: a lamp housing; a light source socket detachably attached to the lamp housing; a light guide configured to guide a light emitted by a semiconductor light-emitting element on the light source socket; and a holding member configured to hold the light guide at a predetermined position in the lamp housing, wherein the light guide includes a light-incident portion on which the light emitted by the semiconductor light-emitting element is incident, and the holding member includes a positioning portion configured to be in contact with the light-incident portion so as to hold the light-incident portion at a fixed position with respect to the semiconductor light-emitting element.

Further, the lamp of the present disclosure includes a light-shielding wall which surrounds the semiconductor light-emitting element on the light source socket and the positioning portion configured to position the light-incident portion of the light guide near the light-shielding wall. A reflective film is provided on the inner surface of the light-shielding wall so as to return the light emitted from the semiconductor light-emitting element to the periphery of the light-incident portion to the light-incident portion.

The positioning portion configured to position the light-incident portion is not limited to a specific configuration. However, in one embodiment of the present disclosure, the holding member is configured to sandwich the light-incident portion of the light guide between two components. Specifically, the holding member includes a pair of holding members that face each other with the light-incident portion interposed therebetween, and the positioning portions are formed on respective facing surfaces of the holding members so as to sandwich the light-incident portion therebetween.

The shape of the light guide is not particularly limited. For example, the light guide used for the vehicular lamp includes a light-incident portion on which the light emitted by the semiconductor light-emitting element is incident, a rod-shaped light-emitting portion which extends in a substantially straight or gently curved shape, and a substantially U-shaped light guide portion. The holding member is provided with a sheath portion covered by the rod-shaped light-emitting portion, and a reflective film is provided on the inner surface of the sheath portion to collect light emitted by the light-emitting portion.

In this case, it is desirable to bend the light-incident portion of the light guide in a direction away from the light-emitting portion so that a long light guide may be connected to the semiconductor light-emitting element on the light source socket at a limited space in the lamp housing. Further, in order to allow the light emitted from the semiconductor light-emitting element to be efficiently incident on the light guide having a limited thickness, the light-incident portion of the light guide may be formed in a tapered shape of which a diameter is increased toward the semiconductor light-emitting element.

According to the lamp of the present disclosure, the light-incident portion of the light guide is always held at a constant position with respect to the semiconductor light-emitting element on the light source socket, thereby enhancing the reliability of a socket lamp.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Figure 1:
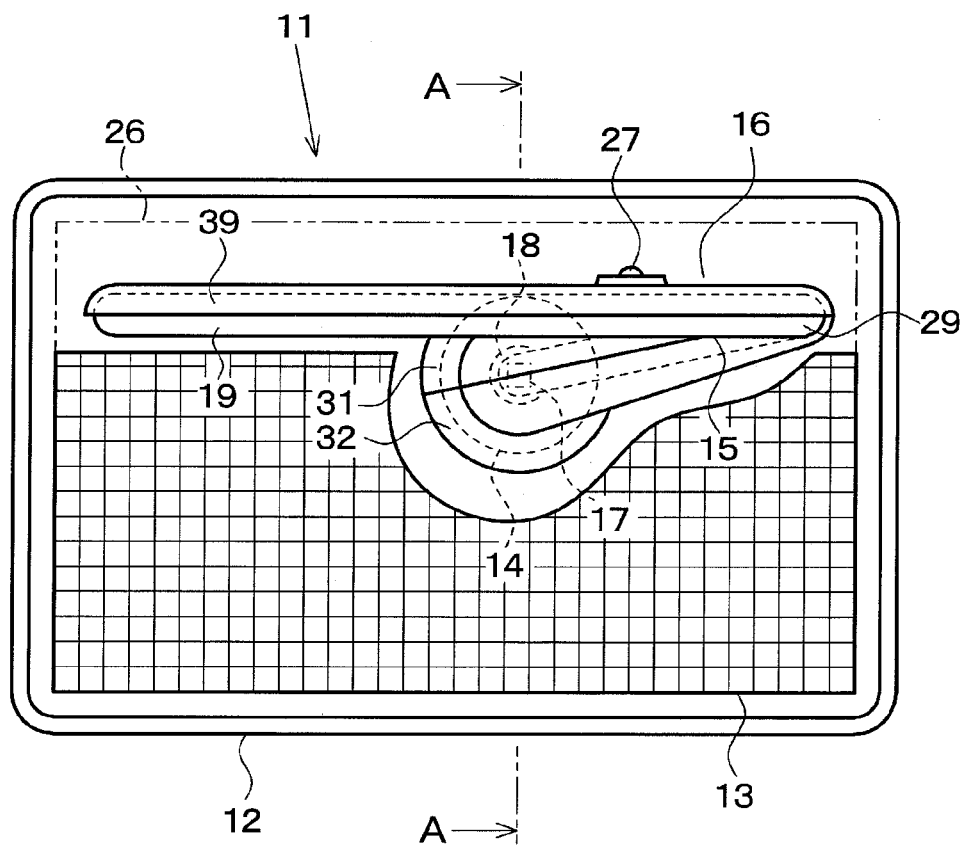
FIG. 1 is a front view of a vehicular lamp according to an embodiment of the present disclosure.

Hereinafter, one embodiment in which the present disclosure is implemented in a vehicular lamp will be described with reference to the accompanying drawings. FIG. 1 illustrates the inside of the vehicular lamp 11 from which an outer lens and an inner lens are removed. The vehicular lamp 11 includes a housing 12, a reflector 13 is provided inside the lamp housing 12, and a light source socket 14 is disposed behind the reflector 13. A light guide 15 is provided above the reflector 13 and held at a predetermined position in the lamp housing 12 by a holding member 16. In addition, an LED 17 as a semiconductor light-emitting element is mounted on the light source socket 14, and the light guide 15 is provided with a light-incident portion 18 on which the light emitted by the LED 17 is incident and a light-emitting portion 19 which emits light with the light induced from the light-emitting portion 18.

Figure 2:
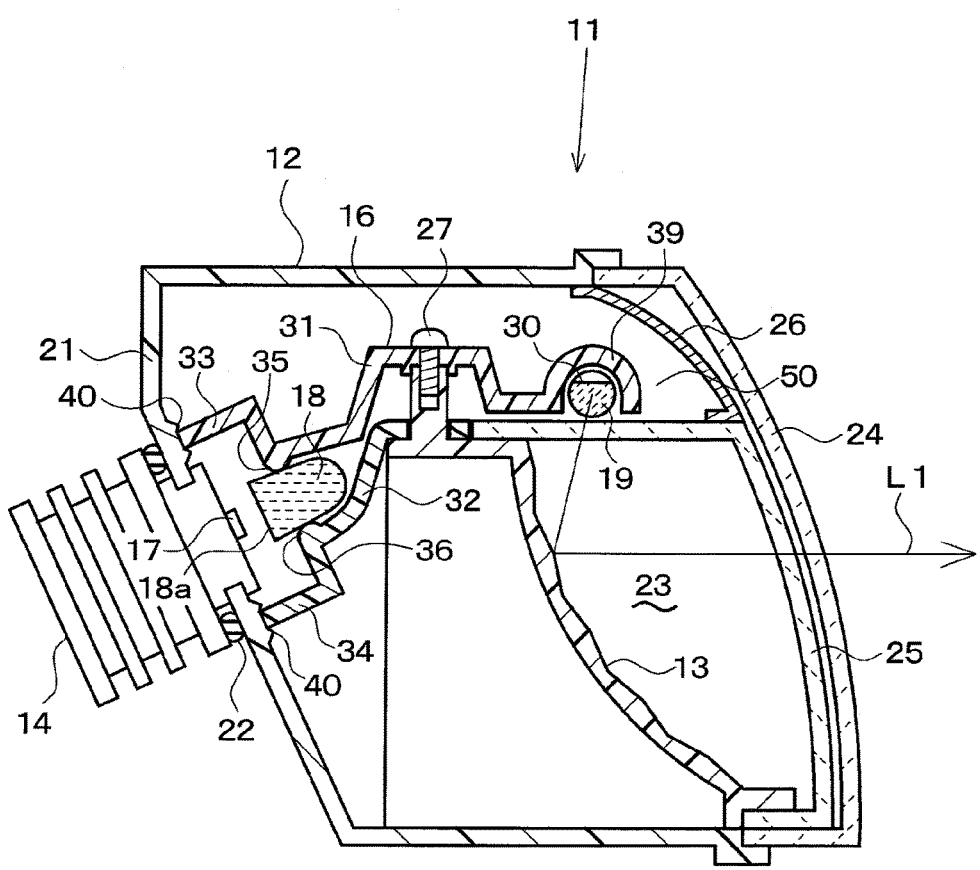
FIG. 2 is a cross-sectional view taken along the line A-A of FIG. 1.

As illustrated in FIG. 2, the light source socket 14 is detachably attached to a rear wall 21 of the lamp housing 12 via a packing 22. A lamp chamber 23 is formed inside the lamp housing 12, and the front surface of the lamp chamber 23 is covered with an outer lens 24. An inner lens 25 is disposed inside the outer lens 24, an extension 26 is provided on the inner lens 25, and the light guide 15 and the holding member 16 are shielded from the front of the lamp by an extension 26. The inner lens 25 and the reflector 13 are fixedly assembled to the lamp housing 12 by an appropriate member and the holding member 16 is assembled on the reflector 13 by a screw 27.

Figure 3:
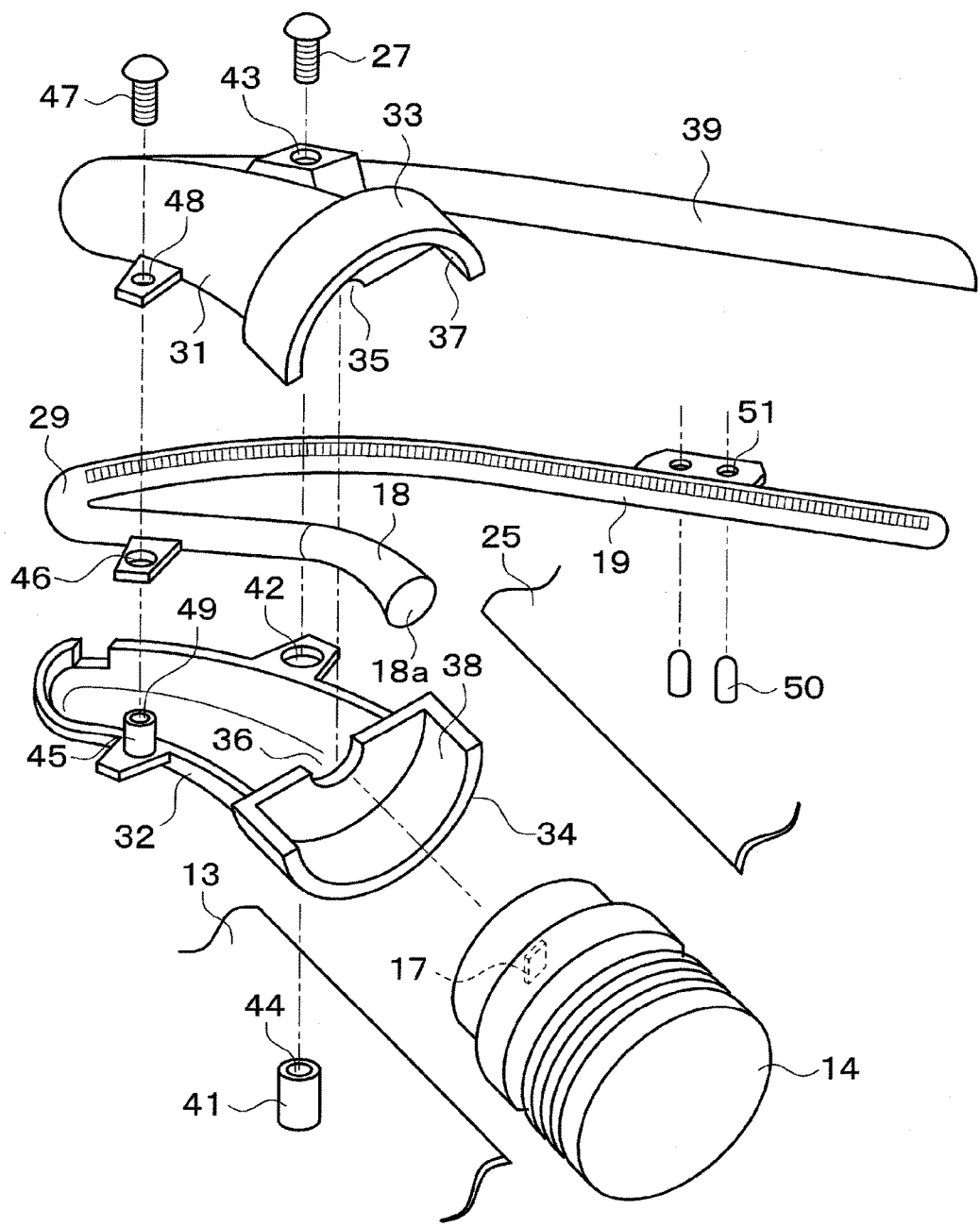
FIG. 3 is an exploded perspective view illustrating a positioning structure of a light guide.

As illustrated in FIG. 3, the light guide 15 is formed of a rod-shaped transparent material to be entirely elongated. A U-shaped light guide portion 29 is provided between the light-incident portion 18 and the light-emitting portion 19 of the light guide 15, and the light emitted from the LED 17 is guided from the light-incident portion 18 to the light-emitting portion 19 by the light guide portion 29. The light-incident portion 18 is curved in a direction away from the light-emitting portion 19 and formed in a tapered shape of which the diameter is gradually increased toward the LED 17 (D1>D2 in FIG. 4), and an incident surface 18a is provided in the maximum diameter portion of the light-incident portion 18. The rod-shaped light-emitting portion 19 extends in a gentle arcuate or straight line above the reflector 13, and the light inside the light guide 15 is emitted toward the reflector 13 by a number of steps 30 arranged in the upper portion of the light-emitting portion 19 so that the light L1 reflected from the reflector 13 (see, e.g., FIG. 1) is radiated to the front of the lamp through the inner lens 25 and the outer lens 24.

The holding member 16 includes a first holding member 31 and a second holding member 32 which face each other with the light guide 15 interposed therebetween. The first holding member 31 is formed so as to cover the entire light guide 15 from the upper side, and the second holding member 32 is formed so as to receive a portion of the light-incident portion 18 and the light guide portion 29 of the light guide 15 from the lower side. Light-shielding walls 33 and 34 are respectively formed on the holding members 31 and 32 so as to surround the LED 17, and the end surfaces thereof are engaged with the lamp housing 12 by an engagement portion 40 (see, e.g., FIG. 2) of the rear wall 21. Further, positioning portions 35 and 36 are formed near the light-shielding walls 33 and 34, and the light-incident portion 18 is sandwiched between the positioning portions 35 and 36 in a state where the holding members 31 and 32 are assembled, so that the light-incident portion 18 is held at a fixed position with respect to the LED 17 by contact.

Figure 4:
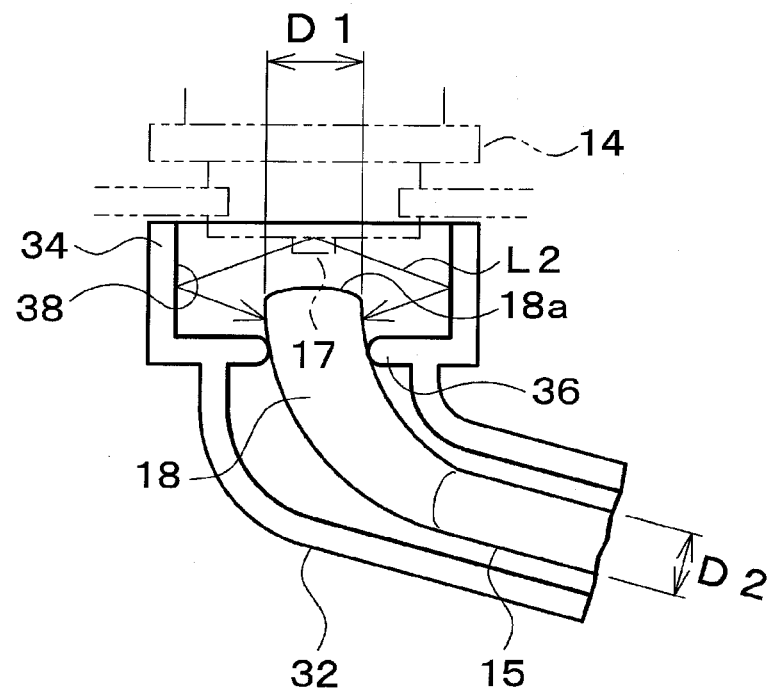
FIG. 4 is a plan view illustrating an optical action by a reflective film of a light-shielding wall.
Figure 5:
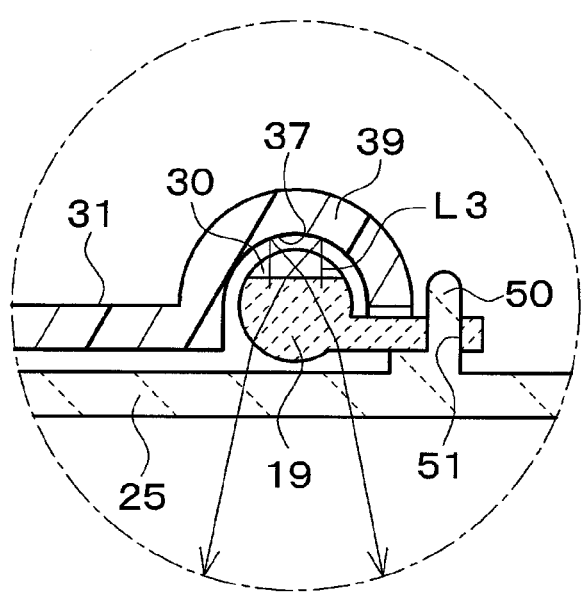
FIG. 5 is a cross-sectional view illustrating an optical action by a reflective film of a sheath portion.

On the inner surfaces of the first and second holding members 31 and 32, reflective films 37 and 38 are formed by depositing aluminum over substantially the entire area thereof. As illustrated in FIG. 4, the reflective films 37 and 38 in the portions corresponding to the light-shielding walls 33 and 34 function as reflection elements that reflect light L2 emitted from the LED 17 to the periphery of the incident surface 18a so as to cause the light L2 to be incident on the light-incident portion 18. Further, as illustrated in FIG. 5, the first holding member 31 includes a semicircular sheath portion 39 to be covered by the light-emitting portion 19, and the reflective film 37 having a length corresponding to the sheath portion 39 collects light L3 emitted from the steps 30 of the light-emitting portion 19 and reflects the light L3 toward the reflector 13 below the light-emitting portion 19.

When assembling the light guide 15 in the vehicular lamp 11 having the above-described configuration, an assembly hole 42 of the second holding member 32 is fitted on a boss portion 41 of the reflector 13 and a screw 27 is fastened to a threaded hole 44 of the boss portion 41 through the assembly hole 43 of the first holding member 31, as illustrated in FIG. 3. At the same time, an assembly hole 46 of the light guide 15 is fitted on a boss portion 45 of the second holding member 32 and a screw 47 is fastened to a threaded hole 49 of the boss portion 45 through the assembly hole 43 of the first holding member 31. Then, a positioning hole 51 in the light guide 15 is fitted on a positioning pin 50 of the inner lens 25. Thus, the holding members 31 and 32 are held at predetermined positions in the lamp housing 12 via the reflector 13, the light-incident portion 18 is sandwiched between the positioning portions 35 and 36, the incident surface 18a is held at a fixed position with respect to the LED 17, and the light-emitting portion 19 is held at a predetermined position of the lamp housing 12 via the inner lens 25.

Therefore, according to the vehicular lamp 11 of the embodiment, the holding member 16 is also used for assembling and positioning the light guide 15 so that the light-incident portion 18 of the light guide 15 may be securely positioned to the LED 17 on the light source socket 14 by being in contact with the positioning portions 35 and 36. Thus, even when the lamp 11 vibrates together with the vehicle body, the relative positions of the LED 17 and the incident surface 18a may be maintained constantly to prevent light leakage from the light-shielding walls 33 and 34. In particular, since the light-shielding walls 33 and 34 return light L2 emitted from the reflective films 37 and 38 to the periphery of the light-incident portion 18 to the light-incident portion 18 and the light-incident portion 18 is formed in a tapered shape of the tip end, it is possible to make the light from the LED 17 having a relatively wide emission angle efficiently incident on the rod-like light guide 15.

In addition, since the holding member 16 includes two components of the first holding member 31 and the second holding member 32, the curved light guide 15 may be easily held at a predetermined position of the lamp housing 12, and the light-incident portion 18 may be accurately positioned on the optical axis of the LED 17. Further, since the light-incident portion 18 is curved in a direction away from the light-emitting portion 19, the long light guide 15 may be regularly arranged in the lamp housing 12 of a limited space for the vehicular lamp 11 equipped with the light source socket 14 on the rear wall 21 of the lamp housing 14. In the meantime, light L3 emitted from the light-emitting portion 19 is collected in the circumferential direction of the light-emitting portion 19 by the reflective film 37 of the sheath portion 39 and supplied to the reflector 13 with a uniform amount of light in the longitudinal direction of the light-emitting portion 19, so that a good light distribution pattern is formed in front of the vehicular lamp 11 by the reflected light L1 of the reflector 13.

Figure 6:
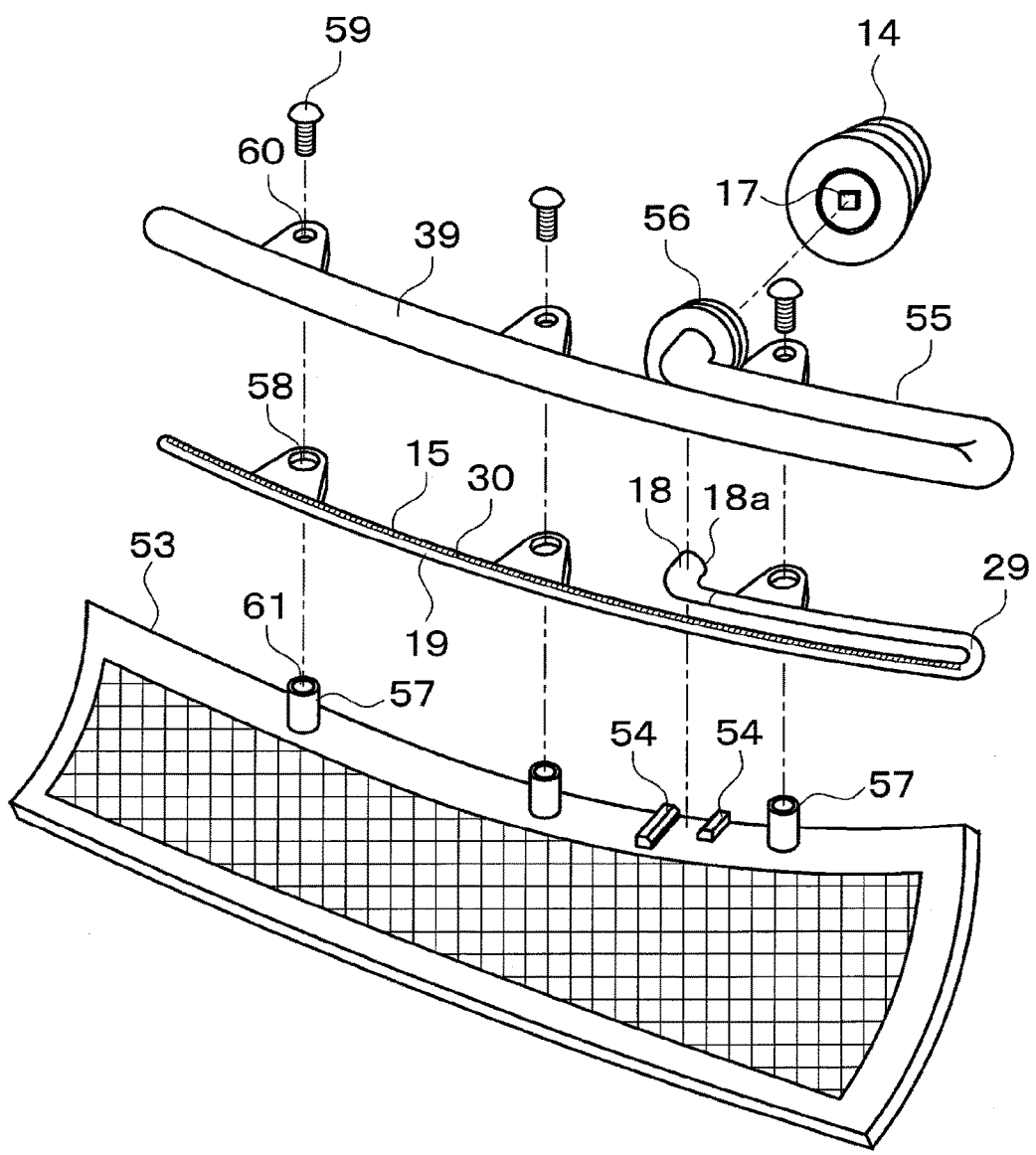
FIG. 6 is an exploded perspective view illustrating an additional example of the positioning structure.

Further, in the above-described embodiment, a dedicated component is used for the second holding member 32 of the holding member 16, but, as illustrated in FIG. 6, the reflector 53 may also function as the second holding member. A rib 54 as a positioning portion is provided to project at the edge portion of the reflector 53, and the light-incident portion 18 of the light guide 15 is positioned between a pair of ribs 54. The holding member 55 includes a light-shielding wall 56 at one end, and a positioning portion and a reflective film (not illustrated) which are the same as those in the above-described embodiment are provided inside the light-shielding wall 56. In addition, the light-incident portion 18 is sandwiched between the positioning portion of the holding member 55 and the rib 54 of the reflector 53, and the light-incident portion 18 is held at a fixed position with respect to the LED 17 by contact.

Therefore, according to the embodiment, an assembly hole 58 of the light guide 15 is fitted on a boss portion 57 on the reflector 53, a screw 59 is fastened to a threaded hole 61 of the boss portion 57 through an assembly hole 60 of the holding member 55, and the light guide 15 is assembled to the predetermined position of the lamp housing (not illustrated) by the holding member 55 through the reflector 53. Thus, in this state, the light-incident portion 18 of the light guide 15 is capable of being securely positioned to the LED 17 on the light source socket 14 by the positioning portion of the holding member 55 and the rib 54.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A lamp comprising: a lamp housing; a light source socket detachably attached to the lamp housing and having a semiconductor light-emitting element mounted thereon; a light guide having a first end and a second end opposite the first end and configured to guide light emitted by the semiconductor light-emitting element on the light source socket; a holding member configured to hold the first end of the light guide at a predetermined position in the lamp housing; a long sheath portion attached directly to the holding member and extending along the light guide to cover at least a portion of the second end of the light guide, and a reflector positioned opposite to the long sheath portion and configured to receive light from the light guide and directly attached to the holding member wherein the light guide includes a light-incident portion at the first end of the light guide on which the light emitted by the semiconductor light-emitting element is incident, and the holding member includes a positioning portion configured to be in contact with the light-incident portion so as to hold the light-incident portion at a fixed position with respect to the semiconductor light-emitting element.

2. The lamp of claim 1, wherein the holding member includes a light-shielding wall surrounding the semiconductor light-emitting element, and the positioning portion is formed near the light-shielding wall.

3. The lamp of claim 2, further comprising a reflective element that is provided on the light-shielding wall so as to cause a part of the light emitted by the semiconductor light-emitting element to be incident on the light-incident portion.

4. The lamp of claim 1, wherein the holding member includes a pair of holding members which face each other with the light-incident portion interposed therebetween, and the positioning portions are formed on respective facing surfaces of the holding members so as to sandwich the light-incident portion therebetween.

5. The lamp of claim 2, wherein the holding member includes a pair of holding members which face each other with the light-incident portion interposed therebetween, and the positioning portions are formed on respective facing surfaces of the holding members so as to sandwich the light-incident portion therebetween.

6. The lamp of claim 3, wherein the holding member includes a pair of holding members which face each other with the light-incident portion interposed therebetween, and the positioning portions are formed on respective facing surfaces of the holding members so as to sandwich the light-incident portion therebetween.

7. The lamp of claim 1, wherein the light guide includes the light-incident portion, a rod-shaped light-emitting portion, and a substantially U-shaped light guide portion configured to guide light of the light-incident portion to the light-emitting portion, and a reflective film is provided on an inner surface of the long sheath portion so as to collect the light emitted from the light-emitting portion.

8. The lamp of claim 2, wherein the light guide includes the light-incident portion, a rod-shaped light-emitting portion, and a substantially U-shaped light guide portion configured to guide light of the light-incident portion to the light-emitting portion, and a reflective film is provided on an inner surface of the long sheath portion so as to collect the light emitted from the light-emitting portion.

9. The lamp of claim 3, wherein the light guide includes the light-incident portion, a rod-shaped light-emitting portion, and a substantially U-shaped light guide portion configured to guide light of the light-incident portion to the light-emitting portion, and a reflective film is provided on an inner surface of the long sheath portion so as to collect the light emitted from the light-emitting portion.

10. The lamp of claim 4, wherein the light guide includes the light-incident portion, a rod-shaped light-emitting portion, and a substantially U-shaped light guide portion configured to guide light of the light-incident portion to the light-emitting portion, and a reflective film is provided on an inner surface of the long sheath portion so as to collect the light emitted from the light-emitting portion.

11. The lamp of claim 5, wherein the light guide includes the light-incident portion, a rod-shaped light-emitting portion, and a substantially U-shaped light guide portion configured to guide light of the light-incident portion to the light-emitting portion, and a reflective film is provided on an inner surface of the long sheath portion so as to collect the light emitted from the light-emitting portion.

12. The lamp of claim 6, wherein the light guide includes the light-incident portion, a rod-shaped light-emitting portion, and a substantially U-shaped light guide portion configured to guide light of the light-incident portion to the light-emitting portion and a reflective film is provided on an inner surface of the long sheath portion so as to collect the light emitted from the light-emitting portion.

13. The lamp of claim 7, wherein the light-incident portion of the light guide is curved in a direction away from the light-emitting portion and formed in a tapered shape of which a diameter is increased toward the semiconductor light-emitting element.

* * * * *